United States Patent

Bathelet

Patent Number: 5,366,624
Date of Patent: Nov. 22, 1994

[54] SEALING RING FOR A BUNDLE OF INORGANIC MEMBRANES IN A FILTERING MODULE

[75] Inventor: Pierre Bathelet, Sainte Foy Les Lyon, France

[73] Assignee: TECHSEP, Courbevoie Cedex, France

[21] Appl. No.: 148,572

[22] Filed: Nov. 8, 1993

[30] Foreign Application Priority Data

Nov. 12, 1992 [FR] France .................. 9213604

[51] Int. Cl.$^5$ .............................. B01D 24/00
[52] U.S. Cl. .................. 210/232; 210/323.2; 210/453; 210/455; 210/321.89; 210/321.8
[58] Field of Search .............. 210/321.89, 231, 232, 210/323.2, 453, 455, 510.1, 321.88, 321.79, 321.8, 346, 350; 29/451

[56] References Cited

U.S. PATENT DOCUMENTS

| | | | |
|---|---|---|---|
| 3,485,374 | 12/1969 | Mansikian et al. | 210/323.2 |
| 3,963,615 | 6/1976 | Plakas | 210/323.2 |
| 3,977,967 | 8/1976 | Trulson et al. | |
| 4,080,294 | 3/1978 | Edwards et al. | |
| 4,461,707 | 7/1984 | Thayer et al. | 210/455 |
| 4,640,774 | 2/1987 | Garcera et al. | 210/323.2 |
| 4,849,104 | 7/1989 | Garcera et al. | |
| 4,897,191 | 1/1990 | Langerak et al. | |

FOREIGN PATENT DOCUMENTS

0062086 10/1982 European Pat. Off. .
3-137924 9/1991 Japan .

*Primary Examiner*—Frank Spear
*Assistant Examiner*—Ana M. Fortuna
*Attorney, Agent, or Firm*—Burns, Doane, Swecker & Mathis

[57] ABSTRACT

A filtration module comprises a housing and a bundle of inorganic filtering membranes disposed in the housing. At each end of the bundle a support plate assembly holds the membranes in proper relationship. Each support plate assembly comprises outer and inner plates and a sealing plate sandwiched therebetween. Each membrane extends through aligned holes in the three plates. The sealing plate, formed of an elastomer, includes outer and inner portions and an intermediate portion situated therebetween. The intermediate portion is in sealing relationship with the membranes. The intermediate portion is softer than the outer and inner portions, the Shore A hardness value of the intermediate portion being no greater than about 55, and that of the outer and inner plates being no less than about 65.

10 Claims, 2 Drawing Sheets

SEALING RING FOR A BUNDLE OF INORGANIC MEMBRANES IN A FILTERING MODULE

BACKGROUND OF THE INVENTION

The present invention concerns a filtering module, such as a micro-and ultrafiltration module comprising a bundle of tubular inorganic membranes, and in particular to a sealing ring for use with such membranes.

Because of their high levels of resistance to physico-chemical stresses, membrane modules are being increasingly used for filtering various industrial fluids.

These modules are described in a large number of publications and patents, e.g., in Trulson et al U.S. Pat. No. 3,977,967, the disclosure of which is incorporated by reference herein.

One prior art filtration module of this kind is shown in FIGS. 1–3. The filtration module 1 is composed of a cylindrical housing 2, inside of which is housed a multiplicity of tubular inorganic membranes 3, 3a, 3b, etc., arranged parallel to each other in a bundle extending through at least two perforated support plate assemblies located at both ends of the housing which hold the membranes in longitudinal position.

Each support plate assembly comprises a backplate 4 (or 4a), an inner plate P1, and a sealing plate 7 (or 7a). The backplate 4 (or 4a) is bored with as many holes 5, 5a, and 5b, etc. as there are membranes. The sealing plate is formed of an elastomer having a Shore A hardness value less than 60. Each membrane 3, 3a, 3b, etc., passes through the corresponding hole 5, 5a, 5b, etc., of the backplate, through a corresponding hole 6, 6a, 6b, etc., drilled through the elastomer sealing plate 7 (or 7a), and though a hole 30a, 30b, 30c, etc., drilled through the inner plate.

Threaded rods 8 are arranged around the inner periphery of the housing 2. The sealing plate 7 (and 7a) and the backplate 4 (and 4a) are attached to these rods, through holes 9 and 10 drilled respectively in the backplate and sealing plate. The assembly of plates is tightened by means of nuts 11. A sealing ring 12 (and 12a) is arranged on the head of the module. The piping-/module unit is locked in place by a collar 13, 13a or by a system of flanges.

FIG. 3 illustrates a membrane 3 extended through the holes in the support plate P1, the sealing plate 7, and the backplate 4.

The filtration module 1 functions in the following way:

The fluid to be treated enters in the direction of the arrow $F_1$ and emerges at the other end of the module, in the direction of the arrow $F_2$.

The permeate circulating on the outside of the membranes 3 and to the inside of the housing 2 re-emerges through openings 14, 14a in the direction of the arrows $F_3$ and $F_4$.

In filtration modules of the type shown in FIGS. 1, 2, and 3, the delicate part is the sealing plate 7, 7a. This part is of crucial importance, since it provides fluid-tightness first between the permeate circulating inside the housing 2 and to the outside of the membranes 3, and second, the residue circulating inside the membranes through the module and which flows to the ends of these membranes. This sealing plate must be sufficiently soft to allow proper fluid-tightness to occur. However, in the case illustrated in FIG. 3, it happens very frequently that, during rises in the temperature of the residue and under the effect of the compression exerted on the sealing plate 7 by the plates 4 and $P_1$, portions 21, 22 of the sealing plate may tend to be extruded or squeezed longitudinally into clearances 23, 23a formed between the membrane 3 and the plates 4, $P_1$, respectively, as shown in FIG. 3.

These rises in temperature of the residue may reach approximately 130° C. during steam sterilization of the membranes, for example, or in certain industrial processes requiring a high temperature of more than 100° C. This extrusion of the sealing plates 7, 7a and the relative motion between the membranes and the housing 2 during expansion causes deterioration of the sealing plate and, consequently, the loss of fluid-tightness.

Moreover, the compactness of the ultrafiltration modules and the large dimensional tolerances of the tubular mineral membranes do not make it possible either to decrease clearance or to use anti-extrusion rings to enclose the sealing plates 7, 7a.

Although the above-described extrusion phenomenon could be presented by using sealing plates 7, 7a of a sufficiently high level of hardness, the resulting diminished flexibility of the sealing plate may eliminate the fluid-tightness of some or all of the membranes in the module.

Therefore, it would be desirable to prevent the extrusion phenomenon without eliminating the fluid-tight sealing action.

SUMMARY OF THE INVENTION

The present invention involves a filtration module comprising a housing which defines a longitudinal axis. A bundle of longitudinally extending filtering membranes is disposed within the housing. Holding devices are disposed at respective ends of the bundle for holding the membranes in longitudinal positions. Each holding device comprises a sealing plate sandwiched between an inner plate and an outer plate. The sealing plate, inner plate, and outer plate include sets of longitudinally aligned holes through which respective membranes extend. The holes of the sealing plate are defined by walls arranged in sealing relationship with the membranes. The sealing plate comprises an outer portion, an inner portion disposed longitudinally inwardly of the outer portion, and an intermediate portion situated between the outer and inner portions. Each of the outer and inner portions has a Shore A hardness value of at least about 65, and the intermediate portion has a Shore A hardness value of less than about 55.

The sealing plate is preferably formed of an elastomer, and the filtering membranes are preferably formed of an inorganic material.

The outer, inner, and intermediate portions may be formed by a one piece sealing plate. Alternatively, the sealing plate could comprise three stacked sheets defining the outer, inner, and intermediate portions, respectively.

BRIEF DESCRIPTION OF THE DRAWINGS

The objects and advantages of the invention will become apparent from the following detailed description of a preferred embodiment thereof in connection with the accompanying drawings in which like numerals designate like elements and in which.

DETAILED DESCRIPTION OF A PREFERRED EMBODIMENT OF THE INVENTION

Figure 4:
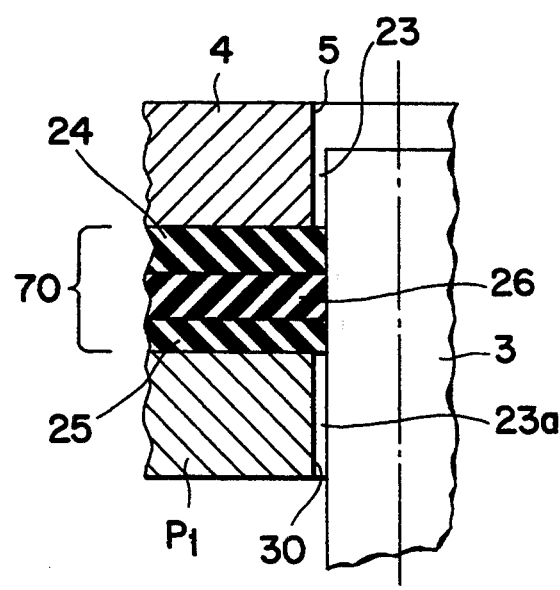
FIG. 4 is a view similar to FIG. 3 of a support plate assembly according to the present invention.

With reference to FIG. 4, there is depicted a support plate assembly through which a membrane 3 extends. The support plate assembly comprises a perforated inner plate $P_1$, a back plate 4, and a sealing plate 70 sandwiched therebetween. The membrane 3 extends through a set of aligned holes in the plates $P_1$, 4 and 70. Those plates would, of course, contain many sets of holes (not shown) through which other membranes extend. The sealing plate 70 is formed of an elastomer and defines three superimposed portions or zones 24, 25, 26, arranged successively in the longitudinal direction of the membrane. The outer and inner zones 24, 25 have a Shore A hardness value no less than about 65, and the intermediate (e.g., central) zone 26 has a Shore A hardness value no greater than about 55.

The intermediate zone 26 preferably has a Shore A hardness value of between 45 and 50 (most preferably 50), and each of the outer and inner zones 24, 25 has a Shore A hardness value ranging preferably between 70 and 75 (most preferably 75).

The sealing ring 70 may be made in one piece in a manner defining the three aforementioned zones 24-26, or else the sealing plate 70 may be a composite formed by a stack of three separate sheets defining those three zones.

The sealing plate could be formed of one-piece to define the three portions or zones 24-26 by causing the composition of the elastomer (e.g., filler, catalyst, plasticizer, etc.) to vary along the thickness of the ring 70.

Figure 1:
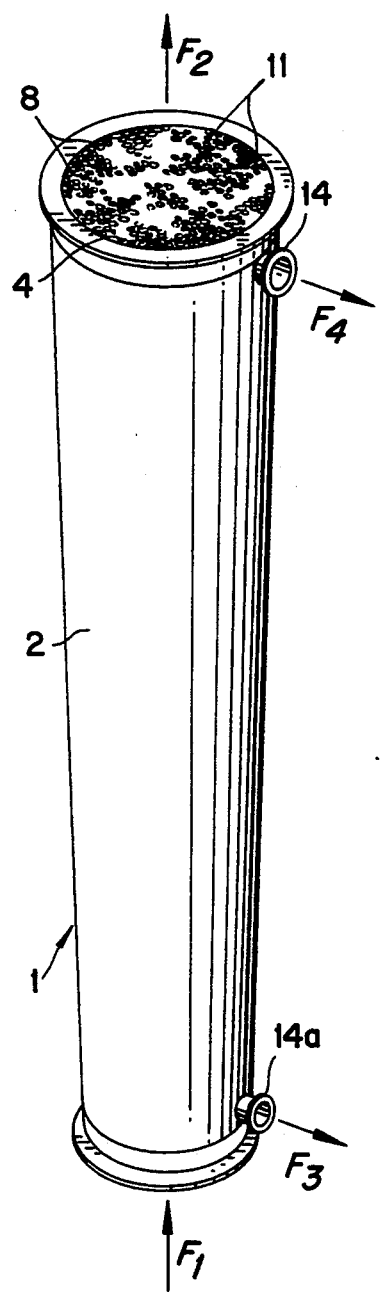
FIG. 1 is a top perspective view of a prior art filtration module.
Figure 2:
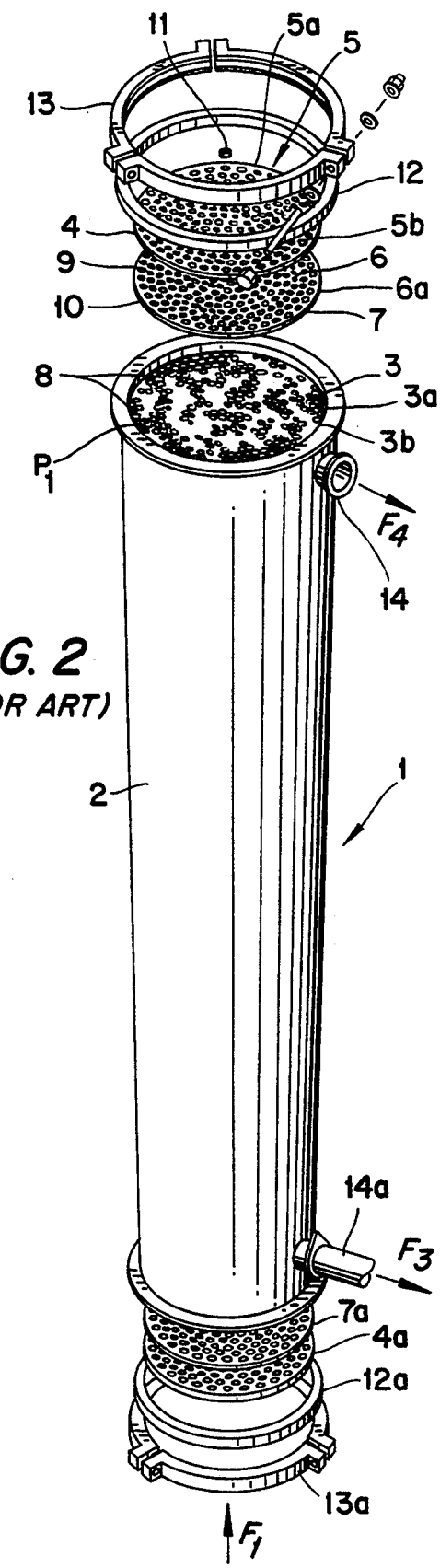
FIG. 2 is a view similar to FIG. 1 with end portions of the module being exploded.
Figure 3:
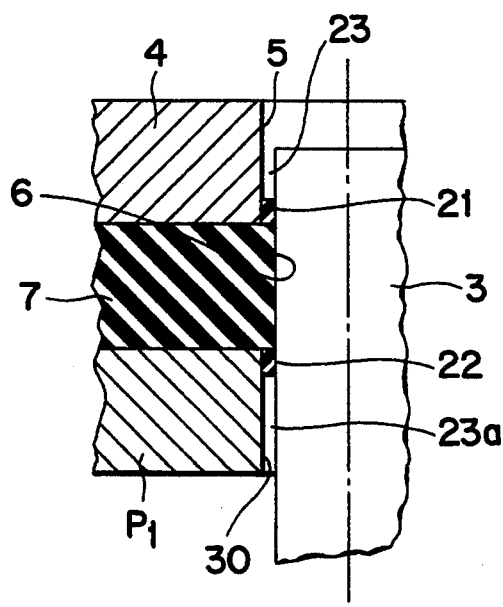
FIG. 3 is a fragmentary sectional view taken though a prior art support plate assembly.

If the sealing plate 70 comprises a composite of three separate sheets to form the three portions or zones 24, 25, 26, those sheets would preferably have thicknesses that are substantially similar (e.g., thicknesses of 2.10 mm). Moreover, the three superimposed sheets would have a total thickness substantially similar to that of the soft ring 7 disclosed in connection with FIG. 3, which comprises a single sheet. The three sheets would be stacked, and then the sets of aligned holes would be drilled through the stack.

The module 1 may comprise a bundle of 120 hollow membranes 3, 3a, 3b, etc., each membrane being 1.2 meters in length and having an inner diameter of 0.6 cm and an outer diameter of 1 cm.

The ultrafiltration module 1 comprising the sealing joint 70 according to the invention undergoes a sterilization cycle comprising the following steps:

Wetting of the membranes at 6 bars for 20 minutes;

First cycle: circulation of steam at 122° C. for 29 minutes, then cooling for three hours;

Second cycle: circulation of steam at 122° C. for 29 minutes, then at 125° C. for 15 minutes, then cooling for two hours;

Third cycle: circulation of steam for 25 minutes and cooling for 10 hours;

Wetting of the membranes at 6 bars for 15 minutes;

Fourth cycle: sterilization at 125° C. for 35 minutes, then cooling for four hours and steam pressure of 1 bar.

The backplates 4, 4a are then easily detached, and no apparent extrusion of the sealing ring 70 into the clearances 23, 23a is observed.

Any suitable elastomer material can be used to make the sealing ring 70, but preferably the elastomer is a silicone, a butyl or nitrile rubber, or Viton.

It will be appreciated that the intermediate zone 26 is soft enough to create an effective seal with the membrane, whereas the outer and inner zones 24, 25 are hard enough to prevent the intermediate portion from being squeezed into the clearances 23, 23a.

Although the present invention has been described in connection with a preferred embodiment thereof, it will be appreciated by those skilled in the art that additions, deletions, modifications, and substitutions not specifically described may be made without department from the spirit and scope of the invention as defined in the appended claims.

What is claimed is:

1. A filtration module comprising a housing defining a longitudinal axis; a bundle of longitudinally extending filtering membranes disposed in said housing; and holding means disposed at respective ends of said bundle for holding said membranes in longitudinal positions, each holding means comprising a sealing plate sandwiched between an inner plate and an outer plate, said sealing plate, inner plate, and outer plate including sets of longitudinally aligned holes through which said membranes extend, said holes of said sealing plate defined by walls arranged in sealing relationship with said membranes, said sealing plate including:

an outer portion, an inner portion disposed longitudinally inwardly of said outer portion; and an intermediate portion situated between said outer and inner portions;

each of said outer and inner portions having a Shore A hardness value of no less than about 65, and said intermediate portion having a Shore A hardness value no greater than about 55.

2. A filtration module according to claim 1, wherein said intermediate portion has a Shore A hardness value between 45 and 50, and each of said outer and inner portions has a Shore A hardness value between 70 and 75.

3. A filtration module according to claim 1, wherein said outer, inner and intermediate portions are formed by a one-piece sealing plate.

4. A filtration module according to claim 1, wherein said sealing plate comprises three stacked sheets defining said outer, inner, and intermediate portions, respectively.

5. A filtration module according to claim 1, wherein said sealing plate is formed of an elastomer.

6. A filtration module according to claim 1, wherein said membranes are formed of an inorganic material.

7. A filtration module comprising a housing defining a longitudinal axis; a bundle of longitudinally extending filtering membranes disposed in said housing; and holding means disposed at respective ends of said bundle for holding said membranes in longitudinal positions each holding means comprising a sealing plate sandwiched between an inner plate and an outer plate, said sealing plate, inner plate, and outer plate including sets of longitudinally aligned holes through which said membranes extend, said holes of said sealing plate defined by walls arranged in sealing relationship with said membranes, said sealing plate comprising:

an outer portion, an inner portion disposed longitudinally inwardly of said outer portion; and an intermediate portion situated between said outer and inner portions;

each of said outer, inner, and intermediate portions comprising an elastomeric material, said intermediate portion being softer than each of said outer and inner portions.

8. A filtration module according to claim 7, wherein said outer, inner, and intermediate portions are formed by a one-piece sealing plate.

9. A filtration module according to claim 7, wherein said sealing plate comprises three stacked sheets defining said outer, inner, and intermediate portions, respectively.

10. A filtration module according to claim 7, wherein said filtering membranes are formed of an inorganic material.

* * * * *